United States Patent
Haegele et al.

(10) Patent No.: US 9,533,717 B2
(45) Date of Patent: Jan. 3, 2017

(54) CONNECTING ARRANGEMENT

(75) Inventors: Klaus Haegele, Heuchlingen (DE);
Wilfried Heise, Rottenburg (DE);
Asmir Salkic, Ulm (DE); Joachim Seidel, Koengen (DE)

(73) Assignee: Daimler AG, Sttutgart (DE)

( * ) Notice: Subject to any disclaimer, the term of this patent is extended or adjusted under 35 U.S.C. 154(b) by 276 days.

(21) Appl. No.: 13/992,301

(22) PCT Filed: Oct. 15, 2011

(86) PCT No.: PCT/EP2011/005189
§ 371 (c)(1),
(2), (4) Date: Aug. 26, 2013

(87) PCT Pub. No.: WO2012/076074
PCT Pub. Date: Jun. 14, 2012

(65) Prior Publication Data
US 2013/0330124 A1 Dec. 12, 2013

(30) Foreign Application Priority Data
Dec. 8, 2010 (DE) .......... 10 2010 053 843

(51) Int. Cl.
F16B 17/00 (2006.01)
B62D 27/02 (2006.01)
B62D 29/00 (2006.01)

(52) U.S. Cl.
CPC ............. B62D 27/02 (2013.01); B62D 27/026 (2013.01); B62D 29/005 (2013.01); *Y10T 403/70* (2015.01)

(58) Field of Classification Search
CPC ..... B62D 27/02; B62D 27/023; B62D 27/026; E04B 1/2403; B22D 29/001; B22D 29/004; B22D 29/041; B22D 29/005; Y10T 403/70; F16B 5/01; F16B 5/02
USPC ... 403/192, 193, 194, 199, 201, 345; 296/29
See application file for complete search history.

(56) References Cited

U.S. PATENT DOCUMENTS 3,468,571 A * 9/1969 Farmer .................. 403/381
4,596,105 A * 6/1986 Farmer .................. 52/697
4,742,661 A * 5/1988 Burtelson ............... 52/697
5,716,155 A * 2/1998 Yoshida et al. ............ 403/187
5,836,712 A * 11/1998 Zetterstrom ............... 403/334
6,971,212 B1 * 12/2005 Johnson et al. ......... 52/651.02
7,727,095 B2 6/2010 Davis et al.
8,172,484 B2 * 5/2012 Tsukamoto ......... E21D 21/0006
405/259.1

(Continued)

FOREIGN PATENT DOCUMENTS

DE 10 2004 018 977 A1 11/2005
DE 10 2005 024 263 A1 12/2006

(Continued)

*Primary Examiner* — Gregory Binda
*Assistant Examiner* — Nahid Amiri
(74) *Attorney, Agent, or Firm* — Crowell & Moring LLP

(57) ABSTRACT

A connection structure between a first and a second component, the second component being formed from a steel material. The first component is made from a lightweight construction material of the minimum possible weight and having a high degree of stiffness, such as a fiber-reinforced plastic. Both components are connected by a metallic intermediate component, which is non-detachably connected by a plug-in means of connection with the first component.

7 Claims, 1 Drawing Sheet

(56) References Cited

U.S. PATENT DOCUMENTS

| | | | |
|---|---|---|---|
| 9,010,848 B2* | 4/2015 | Andree | B62D 21/06 280/793 |
| 2006/0011435 A1* | 1/2006 | Yamaki et al. | 188/376 |
| 2008/0231085 A1 | 9/2008 | Westing et al. | |
| 2010/0230928 A1* | 9/2010 | Falke et al. | 280/279 |

FOREIGN PATENT DOCUMENTS

| | | | | |
|---|---|---|---|---|
| DE | 10 2009 014 206 A1 | | 9/2010 | |
| DE | WO 2012072160 A1 * | | 6/2012 | B62D 21/06 |
| JP | 4-49220 U | | 4/1992 | |
| JP | 6-53818 U | | 7/1994 | |
| JP | 2001-314094 A | | 11/2001 | |
| JP | 2004-57673 A | | 2/2004 | |
| JP | 2007-313289 A | | 12/2007 | |
| JP | 2009-219652 A | | 10/2009 | |

* cited by examiner

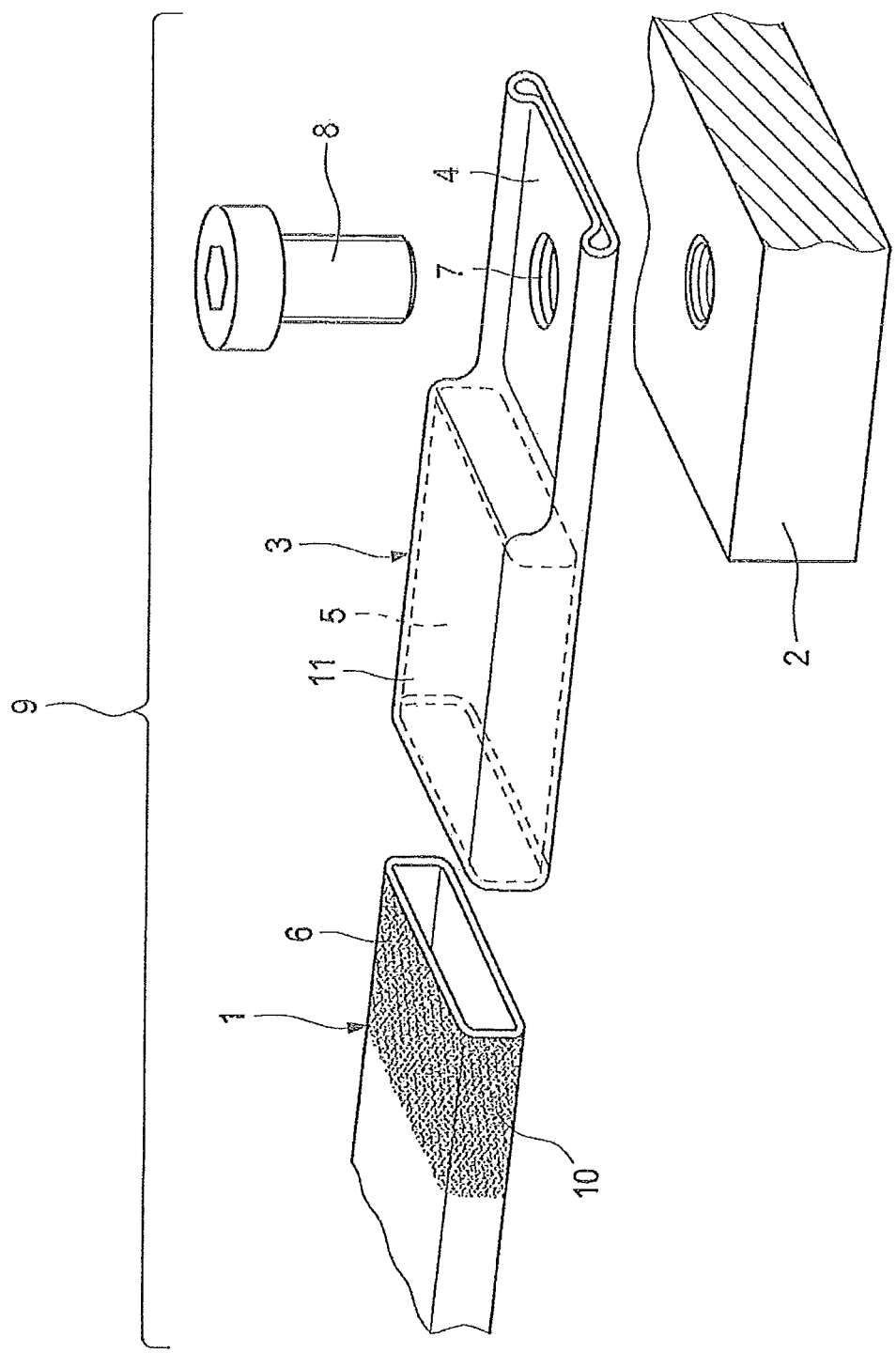

CONNECTING ARRANGEMENT

BACKGROUND AND SUMMARY OF THE INVENTION

Exemplary embodiments of the present invention relate to a connection structure.

German patent document DE 10 2004 018 977 A1 discloses a generic type of connection structure. An under body construction of a motor vehicle is described therein, which has diagonal struts for stiffening. The struts are provided with screw holes at their ends and accordingly are screwed onto the vehicle under body.

In order to achieve lightweight construction the use of fiber-reinforced plastics (FRP) is conceivable. However, problems arise in the use of screwed connections with regard to the setting behavior of the plastic, since this leads to preloading losses. Furthermore, the orientation of the fibers is disrupted and broken due to the screw holes and hence the struts are weakened.

Exemplary embodiments of the present invention are directed to a connection structure in which a first component made of a lightweight construction material with a minimum possible weight, while at the same time having a high stiffness, can be connected with process and operating safety with a second component made of a steel material.

Exemplary embodiments of the present invention employ an intermediate component that facilitates the connection of the two components, in that the first component, which is made of FRP, forms a non-detachable plug-in connection with this intermediate component, which avoids a direct screw connection of the first component with the second component. Accordingly, the setting behavior of the FRP is no longer a concern and the orientation of the fibers is not disrupted or completely broken due to a processing operation, such as drilling, cutting, etc., which is required in the provision of openings. Other potential related damage caused by delamination of the FRP is also prevented. On the basis of the choice of a metallic material, preferably a ferrous material for the intermediate component, a connection to the second component, which consists of a steel material, is relatively simply executed. The use of an FRP material for the first component provides a desired light construction with minimum possible weight and good stiffness. The plug connection is fast, light and is accomplished with process reliability. It is also reliable operationally, even under high mechanical stress. Accordingly, exemplary embodiments of the present invention provide a connection structure for FRP components that is simple to execute and consists of reasonably priced materials, thus favoring a decision for its use in the installation of FRP components in series production. In addition, the manufacture of the connection structure is very satisfactory with regard to assembly considerations, since the FRP component can be delivered with the intermediate component as a pre-assembled module, i.e. delivered in non-detachable connection to then be fixed to the second component.

The intermediate component is preferably formed on one end with a mounting flange, by means of which the intermediate component can be simply and easily joined to the second component. To this end all customary jointing techniques can be advantageously employed. For example, the use of adhesives/bonding, welding, soldering, clinching and even clipping are conceivable. The flange can simply be formed with an opening, such that the intermediate component and—indirectly—also the first component can be screwed to the second component. In particular, the shape of the flange can be matched to the contour of the second component, so that even in the case of more complex component contours, a secure fixing of the intermediate component and the first component to the second component is possible without problem.

The intermediate component can be a forging, casting, machined component-milled or turned. However, preferably the intermediate component is formed as a sleeve with a flattened end. The sleeve can take the form of a section of tube, whose profile is squeezed flat at the end to form a fixing flange. For its manufacture it is conceivable to process the section of tube by means of an internal high pressure forming process, whereby first an optimum cross-section adaptation to the plug-in connection for the first component can be achieved. Second, it is possible to sequence the squeezing process in the same tool as used for the internal high pressure forming process. For this purpose it is merely necessary to integrate appropriate stamps in the tool. It is also possible to execute the squeezing through the tool itself in the course of the closing operation of the tool. Furthermore, the formation of screw openings in the same tool is possible, in which stamping punches are used, which are likewise arranged in the tool.

Particularly preferred is the non-detachable plug-in connection, in the form of an interference fit and/or by means of a layer of adhesive. The interference fit can be achieved by pressing the press-in part of one component into the receptacle of the other component, or by the shrinking of one plug-in partner after it has been fitted onto the other in an initial clearance fit. In the latter technique the metallic intermediate component is very considerably cooled, at least on its end providing the plug-in connection, followed by a sliding together of the two components of the joint, after which the connection is heated up and the interference fit is obtained as a consequence of the expansion of the material of the intermediate component.

Alternatively or additionally, the non-detachable connection can also be formed by an adhesive layer. In this case the receiving end and/or the end of the plug-in partner to be received is/are first coated with a layer of adhesive. The adhesive layer can be moist, and hardens on the sliding together of the layers. However, the adhesive layer can also first be dry and inactive and then activated on the sliding together of the surfaces to be jointed and the application of radiation, triggering their adhesive properties, finally resulting in hardening. An outlet channel to allow for possible overflow of the adhesive is provided in the intermediate component.

Particularly preferred are plug-connected ends of the first component and the intermediate component with extensive separation between them by means of an electrical insulating element extending over the length of the plug connection. This prevents contact corrosion of the steel material of the second component and, if necessary, of the metallic intermediate component. This corrosion is caused due to a relatively large difference in the electrochemical potentials of the first component and the second component and to that of the intermediate component of the connection structure. The electrical insulating element can preferably be an adhesive layer and/or a winding of glass or aramide fiber-reinforced plastic, i.e. a relatively base FRP. The use of the adhesive layer simultaneously provides a non-detachable connection with simple constructional means while also preventing contact corrosion.

The prevention of contact corrosion is particularly important if the first component is made from carbon fiber-reinforced plastic (CFRP), which is a particularly precious material. Additionally, the connection structure according to the invention is important for this material, since the manufactured first component has to carry high mechanical loadings and for this purpose is provided with a unidirectional fiber orientation. In the CFRP material the fiber orientation would be seriously distorted by connection openings and the component would not be usable for the intended application. The connection structure has also been shown to be corrosion resistant to road salt and stone chippings.

Although in the framework of the invention the range of applications of the connection structure is very wide and also associated with aircraft construction, it is particularly preferred that the first component forms a framework structure component, a strut or a supporting component of a motor vehicle, while the second component forms a vehicle body component adjoining or close to the first component. In this respect the application of FRP, preferably CFRP for the lightweight construction of motor vehicles and the associated reduction in emissions and fuel consumption.

BRIEF DESCRIPTION OF THE DRAWING FIGURE

In the following the invention is explained in greater detail on the basis of an example embodiment represented in the drawing. The single FIGURE schematically illustrates an exploded view a connection structure according to the invention with a sleeve-type intermediate component, one end of which has been formed by pressing and flattening the contour.

DETAILED DESCRIPTION

The FIGURE relates to a particular connection of a first strut-type component 1 to an adjoining second component 2, which forms a motor vehicle body component. The strut-type component 1 is made from CFRP and is manufactured using the pultrusion process. The second component 2 consists of a steel sheet or a hollow profile formed from sheet. This also includes drawn tubes.

A sleeve-type metallic intermediate component 3 is provided to avoid weaknesses of the first component 1 due to the provision of access openings. The intermediate component 3 is pressed together onto an end 4 facing away from the component 1. While the pressed together end 4 forms a protruding fixing flange for the second component 2, the opposite open end 11 of the intermediate component 3 has a receptacle 5 for the facing end 6 of the first component 1. It is naturally conceivable that the first component 1 can take the form of a tube, while the intermediate component 3 is formed as a strut or is strut-shaped, so that the cavity of the first component 1 forms the receptacle for the corresponding end of the intermediate component 3. The end 4 of the intermediate component 3 has the described access opening 7 in place of the first component 1, via which the intermediate component 3 can be connected with the second component 2 by means of a screw 8.

For the manufacture of what is essentially the first component 1, the second component 2 and the intermediate component 3 of the connection structure 9 according to the invention, first the end 6 of the first component 1 is coated with an adhesive layer 10. Then the first component 1 with its end 6 is inserted into the receptacle 5 of the intermediate component 3, at which point the adhesive layer 10 comes into contact with the walls of the receptacle and its function takes effect. After the hardening of the adhesive a high load-carrying connection is secured between the first component 1 and the intermediate component 3, whereby the plug connection can no longer be detached even under high mechanical loadings.

For the equidistant alignment of the end 6 of the first component 1 in the receptacle 5 of the intermediate component 3, small spheres of the same diameter, preferably of glass, can be arranged in the adhesive layer 10. It is also conceivable, that one or more channels can be formed in the intermediate component 3 in the region of the receptacle 5, which pass outwards from this. This can dissipate excess adhesive outwards in a targeted fashion. It is also possible, via these channels, to first direct the adhesive to the two connection partners, the intermediate component 3 and the first component 1.

After the adhesive process, the first component 1 is now guided with the intermediate component 3 to the second component 2, where this is screwed tight with the end 4 of the intermediate component. If necessary the screw fixing takes place via a bush, which has to be fixed in the access opening 7, for example pressed into it.

In place of the flange 4 a rotational symmetrical connection piece can also be formed on the intermediate component 3, which carries an external thread, so that the first component 1 can be screwed into an opening of the second component 2 along with the intermediate component. In addition measures are conceivable in this context to provide for the provision of a bayonet connection.

In addition to the adhesive connection and/or the press-on connection, it is conceivable that a latch or snap-on connection could be achieved between the intermediate component 3 and the end 6 of the first component 1. To this end, the walls of the receptacle 5 should to some extent be elastic and have indentations, into which corresponding shaped regions of the end 6 of the first component 1 can latch or otherwise engage. This can reduce the strength of the press fit because the form-locking connection takes over a part of the non-detachable nature of the plug-in connection. The material of the intermediate component 3 is protected in that area in terms of tensile stress, due to the reduction of the strength of the press fit. In the context of the adhesive connection the form-locking connection of the remaining two plug-in partners guarantees their axial relative plug-in position to one another, which is beneficial to the process reliability of the connection of the first component 1 to the second component 2, when the adhesive has not yet hardened, but however the plug-in fitting must be introduced to the second component 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A connection structure, comprising:
   a first component formed from a fiber-reinforced plastic, wherein the first component is a strut of a motor vehicle;
   a second component formed from a steel material, wherein the second component is a body component of the motor vehicle; and
   a metallic intermediate component that is directly connected to both of the first and second components, wherein the intermediate component is directly connected with the first component by a non-detachable plug-in connection and wherein an end of the intermediate component is directly screwed tight with the second component.

2. The connection structure according to claim 1, wherein the intermediate component has a mounting flange on one end, by means of which the intermediate component is joined to the second component.

3. The connection structure according to claim 2, wherein the intermediate component has a sleeve shape that is pressed flat on the one end, and wherein the sleeve shape forms the mounting flange.

4. The connection structure according to claim 1, wherein the non-detachable plug-in connection is formed by an interference fit or an adhesive layer.

5. The connection structure according to claim 1, wherein the first and intermediate components include plug-connected ends forming the non-detachable plug-in connection, and the plug-connected ends of the first and intermediate components are separated by an electrical insulating element over a length of the plug-in connection.

6. The connection structure according to claim 5, wherein the electrical insulating element is an adhesive layer, a winding of glass, or aramide fiber-reinforced plastic.

7. The connection structure according to claim 1, wherein the first component consists of carbon fiber-reinforced plastic with a unidirectional fiber orientation.

* * * * *